Patented June 14, 1949

2,472,799

UNITED STATES PATENT OFFICE 2,472,799

METHOD FOR THE PRODUCTION OF ALKALI-METAL SALTS OF TRIORGANO-SILANOLS

James Franklin Hyde, Corning, N. Y., assignor to Corning Glass Works, Corning, N. Y., a corporation of New York No Drawing. Application November 25, 1946, Serial No. 712,040

3 Claims. (Cl. 260—448.8)

The present invention relates to the preparation of certain organosilicon salts.

Organosilicon materials in which the organic radicals are linked to silicon by carbon to silicon bonds have been described in the literature. Compounds of this type are known which have from one to four organic radicals linked to the silicon. Triorganosilanes have been described in which the remaining valence of the silicon is satisfied by various groups such as chloride, hydroxy and ethoxy.

Objects of the present invention are to provide particular triorganosilanes in which the remaining valence of the silicon is satisfied by oxygen which in turn is linked to alkali metal, and methods for their production.

Compositions prepared in accordance with the present invention are of the type $RR'_2SiOM$ in which R represents methyl, R' represents methyl or phenyl and M represents an alkali metal.

In accordance with the present invention, a triorgano alkoxy silane or products such as are derived from the hydrolysis and condensation thereof are reacted with an alkali metal oxide in the presence of water by eliminating the water from the system. It has been found that under these conditions the reactants, which normally do not produce the compounds here desired, will interact with the production of the desired compositions.

The compounds produced in accordance herewith are of rather unique character. While these compounds are readily hydrolyzed by water, crops of crystalline material may be obtained during the removal of water which contain water of crystallization. In addition to crystallizing with water of crystallization, crystalline complexes are in some cases formed with alcohol and with alkali metal hydroxide.

In conducting the process of the present invention, the alkali metal oxide, which is employed, may be either free of water, in which case water is added to the system, or it may contain some water as in the case of commercial alkali metal oxide. Such water is present as water of composition in alkali metal hydroxide which is present in the oxide. The alkali metal oxide and water may be added in the form of alkali metal hydroxide. When the hydroxide is employed, it is preferred to limit the amount of water present to not more than sufficient to form a concentrated solution, inasmuch as further dilution will merely increase the amount of water to be removed and may result in a decreased yield.

The organosilicon material employed for production of these salts is in general an ester of an organosilane having the desired organo radicals linked to the silicon, or materials such as are produced by the condensation of the hydrolyzate thereof. These condensates are the hexaorganodisiloxanes. When the esters are employed directly, it is preferred to employ the esters of the lower aliphatic alcohols, whereby the alcohol produced upon interaction with the alkali metal hydroxide is liberated, and may be removed by distillation. The ethoxy esters are satisfactory for this purpose, though they frequently result in the salt produced being discolored somewhat by aldol condensation products. By employing the methoxy esters, this discoloration is avoided.

The alkali metal oxide, the organosilicon material which contains the group $RR'_2Si—$, and the water, which together constitute the reaction mixture are heated to effect the interaction. This interaction proceeds as the water is removed by distillation. During the course of the distillation, salt containing water of crystallization frequently crystallizes from the mixture. Upon removal of the hydrated salt and the water the anhydrous salt remains, and may be crystallized or otherwise purified. In this connection, it is to be noted that various of the salts particularly the salts of trimethyl silanol may be sublimed.

It is preferred to have an excess of the organosilicon material present during reaction. This promotes the formation of the simple salt. A particularly desirable manner of operation involves heating a mixture of alkali metal hydroxide and water, and continually adding the disiloxane. In this operation the temperature is preferably maintained at above about 115° C. The water is liberated as the salt is formed.

If desired an excess of alkali metal oxide may be employed. This may result in the formation of a complex with alkali metal hydroxide, which complex may be separated from the simple salt. It may then be interacted with the hexaorganodisiloxane to give the alkali metal salt of the triorganosilanol.

In order to increase the rate of the reaction, it is preferred to add a lower aliphatic alcohol of boiling point below water. In order to remove the alcohol and water, and to facilitate purification of the product, an organic solvent which has a boiling point at least about that of water may be added. After distillation of the water and alcohol, and after removal of any complex salt which may have crystallized, the desired salt in anhydrous state may be recovered from the solvent. Suitable solvents for this purpose are toluene, xylene, heptane and petroleum ether boiling above water. Also petroleum ether of boiling point from 90° to 100° C. may be employed, in which case the distillate is condensed, the petroleum ether separated from the alcohol and water and returned to the reaction mixture.

In the case of the potassium salt of trimethyl silanol, when the amount of water in the system is limited to less than one mol of water per mol of alkali, the water present will crystallize with a portion of the salt as the hydrate. Removal of the water in this way results in the remainder of the salt in solution being anhydrous.

The hydrates, i. e. salts containing water of crystallization, which are at times produced as crops of crystals during the distillation are very soluble in the conventional organic solvents. The anhydrous salts which are obtained are highly hydroscopic and are slightly less soluble in the organic solvents. The hydrates may be dehydrated at atmospheric temperature or at slightly elevated temperature but below the melting point of the hydrate by subjecting the salts to a high vacuum in the presence of a dehydrating agent.

The utility of the salts of this invention as catalysts for the polymerization of cyclic diorganosiloxanes is shown in the copending application Serial Number 766,460, filed August 5, 1947, now Patent 2,453,092.

*Example 1.*—16.2 parts by weight of hexamethyldisiloxane were mixed with 6.2 parts of sodium oxide and 17 parts of methyl alcohol. This mixture was distilled. A residue of 14.35 parts by weight of insoluble material was obtained. 15 parts by weight of hexamethyldisiloxane and 1.8 parts by weight of water were added to the residue. The water was in amount sufficient to convert the sodium oxide to sodium hydroxide. 13.5 parts of methyl alcohol were added gradually with boiling under reflux until solution was complete. On cooling the characteristic needle crystals of the complex of the salt and alcohol crystallized. These crystals had a neutralization equivalent of 176.5. Theory for $(CH_3)_3SiONa \cdot 2CH_3OH$ is 176. Petroleum ether having a boiling range of 90 to 100° C. was added and the mixture was heated to boiling for a short time. A micro-crystalline precipitate was formed which had a neutralization equivalent of 79.5. Theory for $(CH_3)_3SiONa \cdot NaOH$ is 81. The filtrate was evaporated to a solid crystalline residue. This residue had a neutralization equivalent of 114.5. Theory for $(CH_3)_3SiONa$ is 112. This salt gives the following X-ray diffraction pattern:

| d | I/I₁ |
|---|---|
| 2.42 | 1.00 |
| 1.71 | 0.35 |

*Example 2.*—59 parts by weight of trimethylethoxysilane were mixed with 21.6 parts of powdered sodium hydroxide, which had an assay of 92.7% NaOH, and 0.8 part of methyl alcohol. The mixture was refluxed for 24 hours. 11.8 parts of trimethylethoxysilane were then added and refluxing was continued for an additional 18 hours. The reaction mixture was then evaporated under high vacuum for 3 hours. The solid mass was extracted with boiling petroleum ether. The extract was evaporated to dryness, heated under vacuum to free the hydrated salt of water, and the simple salt so obtained was purified by sublimation at 130 to 140° C. under high vacuum. The neutralization equivalent of the product was 113.

*Example 3.*—A mixture of 32.4 parts by weight of hexamethyldisiloxane, 26.9 parts of potassium hydroxide which contained 16.7% water and 1.6 parts of methyl alcohol was prepared and allowed to stand at room temperature for 12 hours. It was then heated to a temperature just below boiling for 24 hours. The slight loss in weight which had occurred was made up by the addition of 3 parts of hexamethyldisiloxane. Refluxing was continued an additional 8 hours. A further 6.5 parts of hexamethyldisiloxane was added and refluxing was continued. The reaction mixture was then extracted in a Soxhlet with diethyl ether. The extract was evaporated to dryness and placed under a high vacuum. The neutralization equivalent of the salt so obtained was 124.1. Theory for $(CH_3)_3SiOK$ is 128. The portion of the reaction product which was insoluble in diethyl ether had a neutralization equivalent of 78.2 and was the complex $(CH_3)_3SiOK \cdot 2KOH$.

*Example 4.*—A mixture of 27.95 parts of hexamethyldisiloxane was refluxed with potassium hydroxide which had a neutralization equivalent of 61.6. After 10 days excess hexamethyldisiloxane was decanted and the residue extracted with diethyl ether to remove the hydrate. The residue was the simple anhydrous salt and had a neutralization equivalent of 126. The X-ray diffraction pattern for the salt produced in Examples 3 and 4 is as follows:

| d | I/I₁ |
|---|---|
| 2.81 | 1.00 |
| 4.45 | 0.92 |
| 3.03 | 0.76 |
| 9.0 | 0.68 |
| 2.98 | 0.56 |

*Example 5.*—A mixture of 28.6 parts by weight of symmetrical diphenyltetramethyldisiloxane and 8 parts of sodium hydroxide was prepared and heated to 225 to 230° C. Methyl alcohol was gradually added during the heating until the alkali had dispersed. This required 24 parts of methyl alcohol. The mixture was heated under vacuum at 100 to 120° C. to remove water and alcohol. The reaction mixture was dissolved in a 50–50 mixture of toluene and methyl alcohol. Upon evaporation, crystallization occurred, the precipitate being a complex of the desired salt. The solution was then placed under high vacuum and slowly heated to a temperature of 225° C. to remove residual disiloxane. The crude salt so obtained was recrystallized from petroleum ether having boiling range from 30 to 60° C. The needle crystals so obtained had a melting point of 87 to 94° C. and a neutral equivalent of 176.5. Theory for $C_6H_5(CH_3)_2SiONa$ is 174.

*Example 6.*—A mixture was prepared of 12.3 parts by weight of symmetrical dimethyltetraphenyldisiloxane and 1.86 parts of sodium oxide which contained a small amount of water. The mixture was heated at 140 to 150° C. and sufficient methyl alcohol was added to disperse the alkali, the amount being between 4 and 8 parts. The reaction mixture was heated under vacuum to remove methanol and water. A viscous reaction product was thereby obtained which was largely dissolved on boiling with 12 to 16 parts of toluene. The insoluble complex with sodium hydroxide was removed by filtering. The toluene solution was evaporated to a semi-solid mass. This mass was dissolved in petroleum ether of boiling range from 90 to 100° C. and petroleum ether of boiling range from 30 to 70° C. was added in order to decrease the solubility. The mono-hydrate of the sodium salt of methyldiphenylsilanol crystallized. This salt was heated at 170° to 180° C. for 5 to 6 hours under a pressure of 5 to 18 mm. The neutralization equivalent of the product so obtained was 238. Theory for the anhydrous salt is 236. The anhydrous salt may if desired be recrystallized readily from petroleum ether.

*Example 7.*—A mixture of 10 parts by weight of sodium hydroxide and 60.5 parts by weight of methyldiphenylethoxysilane was heated to 150 to 160° C. The mixture was allowed to stand for 12 hours at 25° C. It was then heated to 50 to 60° C. for 6 hours with intermittent application of vacuum. The mixture was then heated at 125 to 150° C. for 20 minutes and the mixture allowed to stand at 50 to 60° C. for 12 hours. The reaction mixture was dissolved in a mixture of benzene and toluene, refluxed for an hour and filtered hot whereby the complex of the salt with sodium hydroxide was separated. Petroleum ether of 90 to 100° C. boiling range was added and the benzene removed by evaporation. The monohydrate of the sodium salt of methyldiphenylsilanol was recovered by concentration of the solution. The hydrate was dehydrated over phosphorous pentoxide at 140° C. The salt was recrystallized from petroleum ether.

*Example 8.*—Sixty parts of methyldiphenylethoxysilane was mixed with 17 parts of potassium hydroxide having an assay of 83.3% KOH, the remainder being water. The mixture was heated for ½ hour and then allowed to stand at 25° whereupon the mixture became nearly solid. The mixture was then warmed under vacuum for a short time to remove alcohol in the water, and then placed under high vacuum for 18 hours. The salt so obtained was dissolved in boiling toluene and filtered to remove the complex of the salt and potassium hydroxide. The filtrate was crystallized and yielded the monohydrate of the potassium salt of methyldiphenylsilanol. This salt was dehydrated for 3 hours at 140° C. over phosphorous pentoxide. A product was obtained which had a neutral equivalent of 251. Theory for $CH_3(C_6H_5)_2SiOK$ is 252.4. This salt may be recrystallized from xylene or petroleum ether.

I claim:
1. The method for the production of organosilicon compositions which comprises dehydrating a reaction mixture of an alkali metal oxide, water, and an organosilicon compound selected from the group consisting of compounds of the type $RR'_2SiY$ and $(RR'_2Si)_2O$ where R represents methyl, Y represents alkoxy and R' is selected from the group consisting of methyl and phenyl radicals, whereby a salt is obtained of the general formula $RR'_2SiOM$ in which R represents methyl, R' is selected from the group consisting of methyl and phenyl radicals and M represents an alkali metal.

2. The method in accordance with claim 1 in which the reaction mixture is dehydrated by distillation.

3. The method for the production of organosilicon compositions which comprises dehydrating a reaction mixture of an alkali metal oxide, water, a lower aliphatic alcohol soluble in water, a hydrocarbon solvent having a boiling point at least about that of water and an organosilicon composition selected from the group consisting of compounds of the type $RR'_2SiY$ and $(RR'_2Si)_2O$ where R represents methyl, Y represents alkoxy and R' is selected from the group consisting of methyl and phenyl radicals, effecting the dehydration by distillation whereby the alcohol and water are removed and whereby a solution of a salt is obtained having the general formula $RR'_2SiOM$ in which R represents methyl, R' is selected from the group consisting of phenyl and methyl radicals and M represents an alkali metal.

JAMES FRANKLIN HYDE.

REFERENCES CITED

The following references are of record in the file of this patent:

UNITED STATES PATENTS

| Number | Name | Date |
|---|---|---|
| 2,381,000 | Patnode | Aug. 7, 1945 |
| 2,384,384 | McGregor | Sept. 4, 1945 |
| 2,386,488 | McGregor | Oct. 9, 1945 |
| 2,426,912 | Wright | Sept. 2, 1947 |

OTHER REFERENCES

Volnov: "Journal Gen. Chem.," U. S. S. R. (1940), vol. 10, pages 1600–1604.

Sauer: "Journal Amer. Chem. Soc.," vol. 66 (1944), pages 1707–1710.